US008473962B2

(12) United States Patent (10) Patent No.: US 8,473,962 B2
Hebert et al. (45) Date of Patent: Jun. 25, 2013

(54) SERVICE SELECTION FOR COMPOSITE SERVICES

(75) Inventors: Cedric R. J. Hebert, Mougins (FR); Frederic Montagut, Antibes (FR); Laurent Y. Gomez, Le Cannet (FR); Cedric S. P. Ulmer, Nice (FR)

(73) Assignee: SAP AG, Walldorf (DE)

( * ) Notice: Subject to any disclaimer, the term of this patent is extended or adjusted under 35 U.S.C. 154(b) by 1512 days.

(21) Appl. No.: 11/732,631

(22) Filed: Apr. 3, 2007

(65) Prior Publication Data

US 2007/0233703 A1 Oct. 4, 2007

(30) Foreign Application Priority Data

Apr. 4, 2006 (EP) ..................................... 06007111

(51) Int. Cl.
*G06F 9/46* (2006.01)

(52) U.S. Cl.
USPC .......................................... 718/106; 717/120

(58) Field of Classification Search
None
See application file for complete search history.

(56) References Cited

U.S. PATENT DOCUMENTS

| | | | |
|---|---|---|---|
| 7,707,173 B2* | 4/2010 | Nanavati et al. .............. | 707/608 |
| 2004/0098454 A1 | 5/2004 | Trapp et al. | |
| 2005/0021713 A1* | 1/2005 | Dugan et al. .................. | 709/223 |
| 2005/0147246 A1 | 7/2005 | Agrawal et al. | |
| 2006/0095378 A1 | 5/2006 | Aggarwal et al. | |
| 2008/0077933 A1* | 3/2008 | Montagut et al. ............. | 718/106 |

OTHER PUBLICATIONS

Bhiri et al., "Extending workflow patterns with transactional dependencies to define reliable composite web service", (AICT/ICIW 2006) (Bhiri_2006.pdf).*
Bhiri et al., "Reliable Web services composition using a transactional approach", France, (Bhiri_APR_2005.pdf).*
Bhiri et al., "Transactional Patterns for Reliable Web Services Compositions", National University of Ireland, ACM Jul. 2006, (Bhiri_Jul_2006.pdf).*
Frederic Montagut, SAP Labs France, "Augmenting Web Services composition with Transactional Requirements" Apr. 2006, (Montagut_APR06.pdf).*
Bhiri, S , et al., "Ensuring required failure atomicity of composite Web services", *Proceedings of the 14th International Conference on World Wide Web*, (2005),138-147.
"Poster Presentations by Students and Postdocs", *PORTIA Project Site Visit*, Stanford CA,(May 12-13, 2005),1-25.
Agat, J. , et al., "On Confidentiality and Algorithms", *Proceedings of the 2001 IEEE Symposium on Security and Privacy or Programming Under the Constraints of Noninterference*, (2001),1-14.
Benenson, Zinaida , et al., "Secure Multi-Party Computation with Security Modules", Technical Report Oct. 2004, *RWTH Aachen University of Technology*, (2004),1-12.
Dreiling, A. , et al., "Model-Driven Process Configuration of Enterprise Systems", *Proceedings of the 7th Conference on Wirtschaftsinformatik*, (2005),1-20.
Malkhi, D. , et al., "Fairplay—A Secure Two-Party Computation System", *Proc. Usenix Security Symposium 2004*, (2004),1-20.
Recker, J. , et al., "On the Syntax of Reference Model Configuration—Transforming the C-EPC into Lawful EPC Models", *BPRM 2005, Workshop on Business Process Reference Models*, (2005),1-16.
Sabelfeld, A. , et al., "Language-Based Information-Flow Security", *IEEE Journal on Selected Areas in Communications*, 21(1), (Jan. 2003).
Van Der Aalst, W. , et al., "Workflow Patterns", *Distributed and Parallel Databases*, 14(3), (Jul. 2003),5-51.
Van Der Aalst, W. , et al., "YAWL: Yet Another Workflow Language", *QUT Technical report, FIT-TR-2003-04, Queensland University of Technology, Brisbane*, (2003),1-44.

* cited by examiner

*Primary Examiner* — Emerson Puente
*Assistant Examiner* — Hiren Patel
(74) *Attorney, Agent, or Firm* — Schwegman Lundberg Woessner, P.A.

(57) ABSTRACT

A system for selecting services that are used for a composite service, may include an accessing unit and a processing unit. The accessing unit may be configured to access: tasks of the composite service, transactional requirements of the tasks, services that are configured to fulfill the tasks, and transactional properties of the services. The processing unit may be configured to: compute conditions for services that are configured to fulfill a task and select a service configured to fulfill the task and having transactional properties that fulfill the conditions, wherein the conditions are computed using data comprising the transactional requirements of the tasks.

8 Claims, 4 Drawing Sheets

SERVICE SELECTION FOR COMPOSITE SERVICES

CLAIM OF PRIORITY

The present patent application claims the priority benefit of the filing date of European Application (EPO) No. 06007111.5 filed Apr. 4, 2006, the entire content of which is incorporated herein by reference.

TECHNICAL FIELD

Example embodiments relate to the field of electronic data processing and more specifically to the architecture of composite services.

BACKGROUND

The field of electronic data processing has reached a high level of development. The development has lead to many services that are available in electronic data processing and that provide an abundance of functionalities. A service is a modular unit of a software application that is provided by a computer system, for example, a server or a personal computer (PC). A service may be accessible according to a specified standard and may be useable as a part of different applications. A plurality of services may be composed to give a composite service. A service may be easily accessible for example through the Internet or it may be accessible for example for employees of a company on an internal system for which the access is controlled.

An example for a service is a Web service that may be accessed through the Internet. In an example, data may be exchanged between one or more Web services in the XML standard according to internet based protocols. Composing Web services to give a composite Web service is a powerful way to create new applications that include a complete process. An example for such an application may be an online purchase of a specific product or service.

It is desirable that a composite service provides consistency, that is, the composite service terminates in a consistent state. The composite service may be able to provide the consistency depending on how the services of the composite service behave.

In a contribution to the WWW2005 conference in Chiba with the title "Ensuring Required Failure Atomicity of Composite Web Services" a transactional approach to composite Web services is addressed. The authors Sami Bhiri, Oliver Perrin, and Claude Godart propose transactional rules to verify that a composite Web service provides consistency.

DETAILED DESCRIPTION

The following description contains specific details of exemplary embodiments for illustrative purposes. The specific details are not intended to limit the scope of the embodiments and to be exhaustive regarding possible embodiments.

A variety of services may be available to be used for a composite service. It may be desired to compose services of the variety so that the composite service provides consistency.

An example aspect includes a system for selecting services so that the composite service provides consistency. The system has an accessing unit and a processing unit. The accessing unit is configured to access input data that include tasks, transactional requirements of the tasks, services, and transactional properties of the services. The processing unit is configured to use data that include the transactional requirements of the tasks to compute conditions for services related to a specific task. The processing unit is configured to select a service that is configured to fulfill the specific task and furthermore has transactional properties that fulfill the condition. The transactional requirements define the consistency of the composite service on the process unit level. Accordingly, the transactional requirements are used to compute the conditions and the conditions are task specific. The conditions may furthermore take into account dependencies between different parts of the transactional requirements.

The system allows for composing the composite service so that the composite service provides consistency. A composed service may be verified to provide consistency. Having a large variety of services to select from it may be inefficient to compose a composite service and then verify the consistency. It may take many composite service to find one for which the consistency can be successfully verified. Furthermore, the system may include many different data of each data type, that is, tasks, transactional requirements, services, and transactional properties that have indirect dependencies to select the service. The system computes the conditions to be able to select the service and this is more efficient than varying different service compositions and find one that leads to a composite service providing consistency.

A further example aspect includes a method for selecting the services that are used of the composite service. The method includes accessing the input data, computing the conditions and selecting a service. The system is efficient compared to verifying the consistency of a composed composite service and compared to selecting services without computing the conditions for the services.

A further example aspect includes a computer program product with instructions for a computer system. The instructions are configured to cause the computer system to perform the disclosed method.

Figure 1:
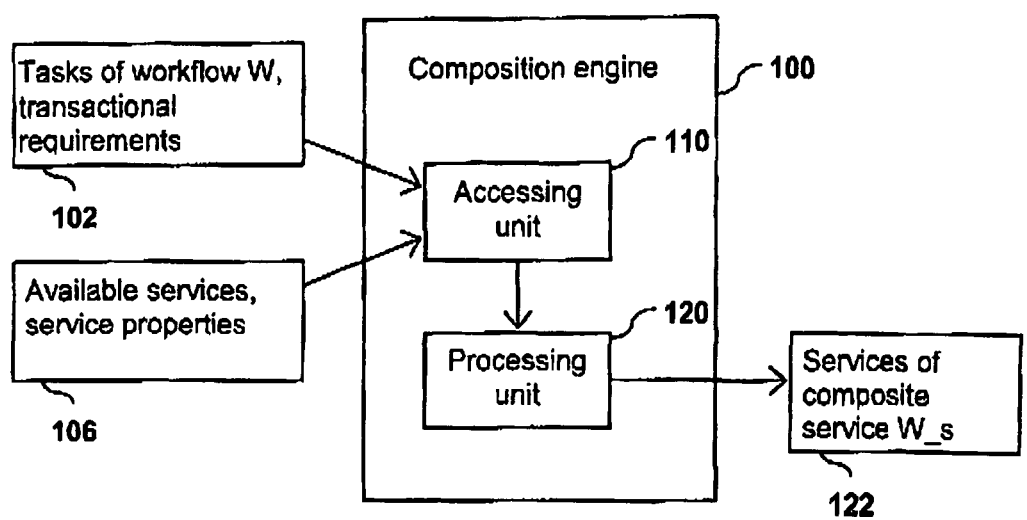
FIG. 1 is a schematic overview of an exemplary embodiment.

FIG. 1 is a schematic overview of an exemplary embodiment. The exemplary embodiment is a system 100 for selecting services, that is, a composition engine. The selected services may be used for a composite service. The system 100 includes an accessing unit 110 and a processing unit 120. Arrows between elements of the figure represent an exemplary exchange of data in the indicated direction.

The system 100 may include a software application and a computer system that runs the computer application. The computer system may for example be an application server or a PC and the software application may be for example a computer program that runs on the computer system. The computer program may further have access to the Internet to identify services, for example web services. The accessing unit 110 may for example be a storage system such as a hard disc drive including a controller to identify and access data on the hard disc drive. In a further example, the accessing unit may include a memory system such as a random access memory (RAM) that is configured to store data. The processing unit 120 may for example be a central processing unit (CPU) that is coupled to the accessing unit to exchange data.

The accessing unit 110 is configured to access a data source 102 that includes tasks and transactional requirements of the tasks. The data source 102 may for example be a file stored on a hard disc drive or accessible in a RAM of the computer system. In a further example, the data source 102 may be a relational data base table. The tasks represent process units of the composite service, that is, the composite service is represented as an integrated process that is broken up into process units. In the example, the tasks together represent a workflow W. Selecting services that fulfill the process of the workflow may result in composite service W_s. In other words, the composite service W_s may be considered as an instance of the Workflow W. The process units may be determined so that each process unit includes functionalities that build a logical unit and that is configured to be separated from further tasks. In a different example the tasks may be determined so that known services may be configured to fulfill the tasks. The transactional requirements of the tasks are such that fulfilling the transactional requirements leads to a consistency of the composite service. The transactional requirements may be expressed in relation to the tasks but can be verified with an instance of the composite service, that is, with a composition of services. Therefore, the transactional requirements be may be related to the services and the transactional behaviour of the services.

In the example, the transactional requirements of the tasks are represented by sets of acceptable termination states of the tasks. Each set of acceptable termination states represents a consistent execution of the composite service. A termination state of a task may be described for example as a completed task, compensated task, a cancelled task, an aborted task, or a failed task. In the example, a set that includes a termination state failed task identifies a unique recovery strategy for the failed task. A recovery strategy determines one or more tasks of the set with termination state completed task and one or more further tasks of the set with termination state compensated task. A compensated task is a termination state that is accessible following a completed task. Therefore, having a unique recovery strategy means that there is one possibility that a failed task may be coordinated with completed or compensated tasks to give a composite service providing consistency. In other words, when a task fails at runtime of the composite service further tasks may be coordinated to reach the state completed or compensated in a unique way. There may be further tasks in the set but they do not have a termination state of compensated or completed and accordingly are not part of the recovery strategy. Therefore, the recovery strategy implies unique decision for each of the respective tasks if either each of the respective tasks may reach the termination state completed or if each of the respective tasks may reach the termination state compensated. In a further example, the transactional requirements may be described by a further representation.

The accessing unit is further configured to access a data source 106 that includes services and transactional properties of the services. The data source 106 may for example be a file stored on a hard disc drive or accessible in a RAM of the computer system. In a further example, the data source 106 may be a relational data base table. The services are configured to fulfill the tasks, that is, the services can be composed to give the composite service. Therefore the services can be assigned to the tasks so that for each tasks there is one of the services that is configured to fulfill the task. There may be more than one service available for fulfilling a task, that is, the functional requirements represented by a task may be fulfilled by one of several services.

The processing unit 120 is configured to compute conditions for services that are configured to fulfill a task and select a service. In the example, the processing unit has a specific task and computes conditions for services for the specific task. The transactional requirements of the tasks are used as input data to compute the conditions. The selected service is configured to fulfill the specific task and has transactional properties that fulfill the conditions. Therefore, the selected task may fulfill functional requirements represented by the task and transactional requirements represented by the conditions.

In the example, the conditions include derived conditions that are derived from a previously selected service. A first derived condition is that the service is compensatable in case that the task has a termination state compensated task in accordance with a unique recovery strategy of a failed task for which a service has been selected previously. A second derived condition is that the service is retriable in case that a unique recovery strategy for the task is not in accordance with transactional properties of a previously selected service. Therefore, the first and second derived conditions represent a requirement that the selected service has a recovery strategy that may be coordinated with previously selected tasks and may be coordinated with recovery strategies of previously selected services.

In the example, the conditions further include transactional conditions that relate to the acceptable termination states of the task. A first transactional condition is that the service is compensatable in case that the task has an acceptable termination state compensated task. A second transactional condition is that the service is retriable in case that the task has not an acceptable termination state task failed.

In the example, the specific task for which the service is selected is selected according to sequence conditions. A first sequence condition may be that a task for which a service is selectable that is configured to fulfill the task and that is compensatable and retriable is selected prior to a task for which a service is not selectable that is configured to fulfill the task and that is compensatable and retriable. A second sequence condition is that a task for which each selectable service that is configured to fulfill the task is not compensatable and not retriable is selected prior to a task for which a service is selectable that is configured to fulfill the task and that is either compensatable or retriable. In the example, the first sequence condition may have a higher priority than the second sequence condition. Therefore, a task for which a service is compensatable and retriable is selected prior to a task for which available services are not compensatable and not retriable. In a further example, the second sequence condition may have a higher priority than the first sequence condition.

In the example, the system 100 may sequentially select the services so that all tasks are fulfilled and write a result to the data source 122. The selected services may be used to create the composite service W_s. In an example, a result of the system may be a table with a column for the tasks of the workflow W and a column for the services of the composite service W_s. Entries of the table specify a task and a selected service that is configured to fulfill the task. The data source 122 may for example be a file stored on a hard disc drive or in a RAM of the computer system. In a further example, the data source 102 may be a relational data base table. The system may further assign the selected services to the tasks for which the services have been selected so that a result may be the composite service W_s that may be ready for execution. It may be that transactional properties of the available service do not allow for a composition of W_s that provides consistency. In such a case a result may be that a consistent composite service cannot be composed with the available services. The result may be faster to compute than trying all possible combinations of the services for the composite service and verify the transactional behaviour of the composite service.

Figure 2A:
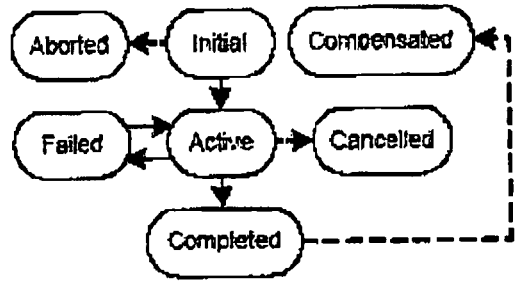
FIG. 2A is a state diagram of a service that is retriable and compensatable.

FIG. 2A is a state diagram of a service that is retriable and compensatable. From the initial state the service may reach the states active and aborted meaning the service is not started due for example to a coordination message because a further service has failed previously. Coordination messages may be part of a coordination protocol that may coordinate execution of the composite service at runtime. From the active state the state cancelled may be reached again maybe due to coordination message, the state failed, or the state completed. The service is retriable so that the service may again reach the state active from the state failed. It may be that a retriable state may be retriable unlimited times so that failed is not an accessible termination state of the service. The state compensated may follow the state completed for example due to a coordination message because a following service has failed. A decision between termination state completed and compensated may depend on a recovery strategy of a following task with a failed service.

Figure 2B:
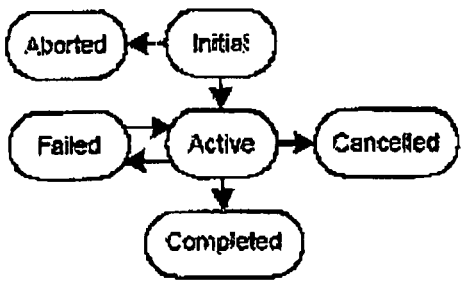
FIG. 2B is a state diagram of a service that is retriable.

FIG. 2B is a state diagram of a service that is retriable. Accordingly, the state compensated is not available following the state completed. Further states and transitions between the states of a retriable service may be identical to states and transitions of a service that is retriable and compensatable.

Figure 2C:
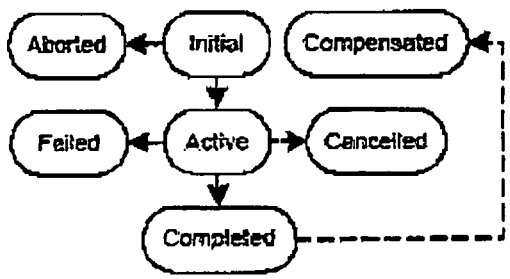
FIG. 2C is a state diagram of a service that is compensatable.

FIG. 2C is a state diagram of a service that is compensatable. Accordingly, the state compensated may follow the state completed and once the state failed is reached the service remains in the failed state.

Figure 2D:
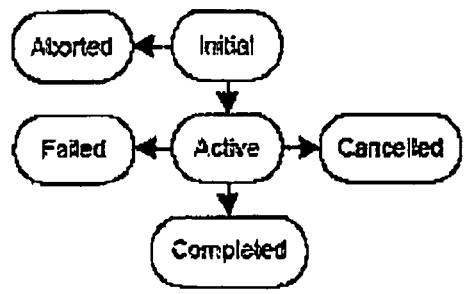
FIG. 2D is a state diagram of a service that is pivot.

FIG. 2D is a state diagram of a service that is pivot. A pivot service is a service that is not retriable and not compensatable. Due to transactional properties a pivot service may be limited with respect to using it in a composite service.

Figures 3A, 3B, 3C, 3D:
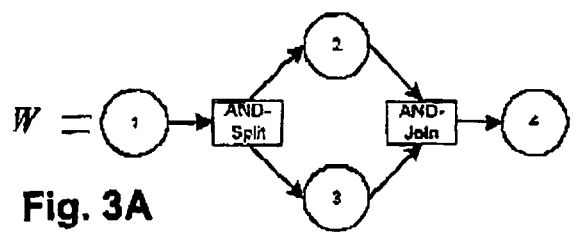
FIG. 3A represents an exemplary workflow including four tasks.
FIG. 3B is an exemplary table of possible termination states of the exemplary workflow.
FIG. 3C is an exemplary table of acceptable termination states for the exemplary workflow.
FIG. 3D is an exemplary table of available services and transactional properties.

FIG. 3A represents an exemplary workflow W including four tasks. The exemplary workflow W may be a workflow of an online booking system of flights. The resulting composite service W_s may be a composite Web service that is accessible through the Internet. In the example, the available services may be web services. In a further example, some of the available services may be web services and some of the available services may be internal services accessible on an internal computer system that may not be connected to the Internet.

The four tasks are numbered from one to four. The first task may be a flight proposal creation that takes into account a client request. A service that may be assigned to the first task may be a request handler service. According to the logic of the workflow it follows an AND-split meaning that two tasks follow the first task. A second task may be a payment of the client and a respective service that may be assigned to the second task may be a payment handler. A third task may be a reservation of the flight and a respective service may be a reservation service. Following a termination of the second task and the third task an AND-join follows representing that both tasks may be required to terminate prior to starting a fourth task. The fourth task may be a printing of a ticket and a respective service may be a ticket printing service.

FIG. 3B is an exemplary table of possible termination states of the exemplary workflow W. Lines of the table represent a set of possible task termination states. The lines are enumerated and according to the table there are 22 sets of possible termination states. In the following a more formal description will be introduced. The composite Web service W_s may consist of a set of n Web services W_s=(s_a) a ∈ [1,n]. The execution is managed according to a workflow W which defines the execution order of a set of n tasks W=(t_a) a ∈ [1,n] performed by the services of the composite Web service W_s.

In the example each service executes one task, however in further examples one or more services may also execute one or more tasks. The assignment of services to tasks is performed by means of composition engines based on functional requirements. The execution of a composite service may have to meet transactional requirements so that an overall assurance of consistency is given. In an example, a service may have a capability to compensate the effects of a given operation or to re-execute the operation after failure. In a further example, a service may not have any of the capabilities. It is therefore desired to select the appropriate service to execute a task whose execution may be compensated if required.

An assignment procedure based on transactional requirements may follow a similar strategy as the one based on functional requirements. It is a match-making procedure between the transactional properties offered by services and the transactional requirements associated to each task. The coordination protocol may be based on rules deduced from the transactional requirements. In the example, the rules may specify the final states of execution or termination states each service has to reach so that the overall process reaches a consistent termination state. According to prior art a two phase-commit coordination protocol may use for example one rule: all tasks performed by different services have to be compensated in case one of them fails. A transactional approach may give more flexibility and may include two issues to be faced: specify a Web service assignment procedure that creates a consistent instance of W and specify the coordination protocol managing the execution of consistent composite service. The services may be selected according to transactional properties according to a match-making procedure. A semantic associated to the transactional properties may be defined for services and the match-making procedure may be based on this semantic. This semantic is also to be used in order to define a tool allowing workflow designers to specify their transactional properties for a given workflow. Using the transactional properties services may be assigned to workflow tasks based on rules which are detailed later on. Once a composite service is defined a protocol may be defined to coordinate the services according to the selected services. The semantic may include three different types of transactional properties of services: compensatable, retriable, and pivot. The transactional properties allow defining four types of services: retriable services, that is, services(r), compensatable services, that is, services (c), retriable and compensatable services, that is, services (rc), and pivot services, that is, services (p). To properly detail the model transactional properties may be mapped with the state of data modified by the services during an execution of computational tasks. The data may be in three different states: initial (0), unknown (x), or completed (1). In state initial (0), the task execution may not yet have started, the execution may have been stopped, or aborted prior to being started, or the execution has been properly completed and the modifications have been rolled back, that is, compensated. In state (1) the task execution may have been properly completed. In state (x), the task execution may not yet have terminated, that is, being active, the execution may have been stopped, cancelled prior to completion, or the execution has failed. Particularly, the states aborted, compensated, completed, cancelled, and failed are the possible final states of execution of the tasks, that is, termination states of the tasks. Inherent termination states, that is, failed and completed may result from a normal course of a task execution. The inherent termination states may be distinguished from termination states resulting from a coordination message received during a coordination protocol instance: compensated, aborted, cancelled. A coordination message may force a task execution to either stop or rollback. The transactional properties of the services may be differentiated by the states failed, and compensated which respectively specify a retriability aspect and a compesatability aspect. A service may be defined to not have a termination state failed in case that the service is retriable. A service may be defined to have a termination state compensated in case the service is compensatable. It may be followed that the states failed, completed and cancelled may be reached in case the service is in the state active. The state compensated may be reached in case the service is in the state completed. The state aborted can be reached if the service is in the state initial. Conditions for services may use the possible termination states of the services, that is, determining for each service executing a workflow task which termination state the service is allowed to reach. For this an operator termination state ts(x) may be defined to specify the possible termination states of an element x. The element x may be a service and accordingly $ts(s) \in \{aborted, cancelled, failed, completed, compensated\}$. The element x may be a workflow task t and $ts(t) \in \{aborted, cancelled, failed, completed, compensated\}$. The element x can be a workflow composed of n tasks $W=(t\_a) a \in [1,n]$ and $ts(W)=(ts(t\_1), ts(t\_2), \ldots, ts(t\_n))$. The element x can be a composite service $W\_s$ composed of n services $W\_s=(s\_a) a \in [1,n]$ and $ts(W\_s)=(ts(s\_1), ts(s\_2), \ldots, ts(s\_n))$. The operator TS(x) may represent a finite set of all possible termination states of the element x. It may be followed that $TS(W\_s)$ is a subset of TS(W) since the set $TS(W\_s)$ represents the actual termination states that can be reached by $W\_s$ according to the transactional properties of the services assigned to W. It may be further defined for x being a workflow or composite service and $a \in [1, n]$: $ts(x, t\_a)$, that is, the value of $ts(t\_a)$ in $ts(x)$ and $tscomp(x)$, that is, the termination state of x such that for all $a \in [1, n]$ it is $ts(x, ta)=completed$.

FIG. 3C is an exemplary table 104 of acceptable termination states for the exemplary workflow. A line of the table represents a set of acceptable termination states (ATS) of the tasks. The lines are enumerated and according to the table 104 there are six sets of acceptable termination states. In each line there is a further identification of the set of possible termination states to which the line may be equal. Furthermore, table 104 represents a valid ATS(W) of the workflow W. In the following description the valid ATS(W) are derived.

The ATS(W) may be obtained by selecting the termination states of the table TS(W) that are consistent and respect the validity rule for the created ATS(W). The ATS may be used as a consistency evaluation tool for the workflow. ATS define the termination states a workflow is allowed to reach so that its execution is judged consistent. ATS(W) may be defined as a subset of TS(W) whose elements are considered to be consistent by workflow designers. ATS(W) may be identified with the transactional requirements of the tasks. A consistent termination state of W is called an acceptable termination state $ats\_k(W)$ and we note $ATS(W)=(ats\_k(W)) k \in [1,i]$. The set TS(W) (see FIG. 3B) and ATS(W) can be represented by tables that define for each termination state the tuple of termination states reached by the workflow task W. A specification of the set ATS(W) may be done at the workflow designing phase. ATS(W) may be used as a decision table for a coordination protocol so that $W\_s$ can reach an acceptable termination state knowing the termination state of at least one task.

The role of a coordination protocol may consist in sending messages to services in order to reach a consistent termination state given the current state of the workflow execution. The coordination decision, that is, the termination state that may be reached, may be made in case a state of the workflow execution has to be unique. A coordination protocol may be characterized by having a unique strategy. Therefore, ATS(W) that may be used as input for the coordination decision-making process has to verify some properties. Because ATS(W) is a subset of TS(W) and ATS(W) inherits the characteristics of TS(W) TS(W) is analyzed first. First basic properties of TS(W) may be derived from inherent execution rules of a workflow W prior to examining TS(W) from a coordination perspective.

Basic properties of elements of TS(W) may be derived from the transactional model presented previously. TS(W) is the set of all possible termination states of W based on the termination states model of the services. Within a service execution it may not be possible to reach all the combinations represented by a n-tuple $(ts(t\_1), ts(t\_2), \ldots, ts(t\_n))$ assuming that for all $a \in [1,n]$ it is $ts(t\_a) \in \{aborted, cancelled, failed, completed, compensated\}$. A first restriction (P1) follows from a sequential aspect of a workflow: a task becomes activated in case that tasks executed previously according to the execution plan of W have reached the state completed. (P1) means that to start the execution of a workflow task it may be required that previously workflow tasks have been completed properly. In the following it is assumed that only single task may fail at a time and that the states aborted, compensated and cancelled can be reached by a task in a given $ts\_k(W)$ in case that one of the services executing a task of W has failed. This means that the coordination protocol may be allowed to force the abortion, the compensation or the cancellation in case of failure of a service. A second restriction (P2) is: in case that there exist a and $k \in [1, n] \times [1, j]$ such that $ts\_k(W, t\_a) \in \{compensated, aborted, cancelled\}$ it follows that there exists exactly one $l \in [1, n]$ such that $ts\_k(W, t\_l)=failed$.

A unicity of the coordination decision during the execution of a coordination protocol may be a requirement. The elements of TS(W) may be identified that correspond to different coordination decisions given the same state of a workflow execution. From this a classification may be followed to determine ATS(W). Using properties (P1) and (P2) an analysis of the state transition model may reveal that there are two situations where a coordination protocol has different possibilities of coordination given the state of a workflow task. Let $a, b \in [1, n]$ and assume that the task $t\_b$ has failed. A first situation is the task $t\_a$ is in the state completed and either it remains in this state or it is compensated. A second situation is the task $t\_a$ is in the state active and either it is cancelled or the coordinator let it reach the state completed.

From the two situations an incompatibility from a coordination perspective and a flexibility may be defined. Let $k, l \in [1, j]$, $ts\_k(W)$ and $ts\_l(W)$ are defined to be incompatible from a coordination perspective if and only if $a,b \in [1, n]$ such that $ts\_k(W, t\_a)=completed$, $ts\_k(W, t\_b)=ts\_l(W, t\_b)=$ failed, and ts_l(W, t_a)=compensated. Otherwise, ts_l(W) and ts_k(W) may be defined compatible from a coordination perspective. The value in {compensated, completed} reached by a task t_a in a termination state ts_k(W) with ts_k(W, t_b)=failed is called a recovery strategy of t_a against t_b in ts_k(W). From this follows a recovery strategy of a set of tasks against a given task. In case that two termination states are compatible the termination state corresponds to the same recovery strategy against a given task.

Furthermore, let a, b ∈ [1, n], a task t_a is defined to be flexible against t_b, if and only if there exists a k ∈ [1, j] such that ts_k(W, t_b)=failed and ts_k(W, t_a)=cancelled. Such a termination state is defined to be flexible to t_a against t_b. The set of termination states of W flexible to t_a against t_b are represented by FTS(t_a, t_b).

From these definitions, we now study the termination states of W according to the compatibility and flexibility criterias to identify the termination states that follow a common strategy of coordination. A further definition follows: let a ∈ [1, n], a termination state of W ts_k(W) is called a generator of t_a if and only if ts_k(W, t_a)=failed and for all b ∈ [1, n] with t_b is executed prior to or in parallel of t_a it is true that ts_k(W, t_b) ∈ {completed, compensated}. The set of termination states of W compatible with ts_k(W) being a generator of t_a is represented by CTS(ts_k(W), t_a). The set CTS(ts_k(W), t_a) specifies all the termination states of W that follow the same recovery strategy as ts_k(W) against t_a.

A further definition concerns a coordination strategy of an instance W_s: let ts_k(W) ∈ TS(W) and be a generator of t_a; coordinating an instance W_s of W in case of the failure of t_a consists in choosing the recovery strategy of each task of W against t_a and the z_a<n tasks (t_a_i) i ∈ [1,z_a] flexible to t_a whose execution is not cancelled when t_a fails. A coordination strategy of W_s against t_a is defined as a set CS(Ws, ts_k(W), (t_a_i) i ∈ [1,z_a], t_a)=CTS(ts_k(W), t_a)-set union of FTS(t_a_i, t_a) i ranging from 1 to z_a. In a more formal description the equation may be expressed as CS(Ws, ts_k(W), (t_a_i) i ∈ [1,z_a], t_a)=CTS(ts_k(W), t_a)-$\cup_{i=1}^{i=z\_a}$ FTS(t_a_i, t_a). In case that a service s_a assigned to t_a is retriable it follows CS(W_s, ts_k(W), (t_a_i) i ∈ [1,z_a], t_a) is equal to an empty set. W_s is said to be coordinated according to CS(W_s, ts_k(W), (t_a_i) i ∈ [1,z_a], t_a) if in case of the failure of t_a, W_s reaches a termination state in CS(W_s, ts_k(W), (t_a_i) i ∈ [1,z_a], t_a). This assumes that the transactional properties of W_s are sufficient to reach ts_k(W).

From the definitions a set of properties can be derived. One property is: W_s can only be coordinated according to a unique coordination strategy at a time. This may be followed from two termination states ts_k(W) and ts_l(W) that are a generator of t_a and are incompatible. A further property is: let a and k ∈ [1, n]×[1, j] such that ts_k(W, t_a)=failed but not generator of t_a. In case that ts_k(W) ∈ TS(W_s) it follows that there exists an l ∈ [1, j] such that ts_l(W) ∈ TS(W_s) is a generator of t_a compatible with ts_k(W).

Given a task t_a elements of TS(W) may be classified using the sets of termination states compatible with the generators of t_a. Using such an approach different recovery strategies and coordination strategies associated with the failure of t_a can be identified. At design time ATS(W), the termination states of W that are consistent may be defined. ATS(W) may be an input to a coordination protocol in order to provide the coordination protocol with a set of rules that leads to a unique coordination decision. According to definitions and properties rules for ATS(W) may be computed so that the unicity requirement of coordination decisions is respected.

For this a valid ATS(W) is defined: let a and k ∈ [1, n]×[1, j] such that ts_k(W, t_a)=failed and ts_k(W) ∈ ATS(W); ATS(W) is defined to be valid if and only if there exists exactly one l ∈ [1, j] such that ts_l(W) is a generator of t_a compatible with ts_k(W) and that (CTS(ts_l(W), t_a)-set union of FTS(t_a_i, t_a) i ranging from 1 to z_a) is a subset of ATS(W) for a set of tasks (t_a_i) i ∈ [1,z_a] that are flexible to t_a. The unicity of the termination state generator of a given task comes from the incompatibility definition and the unicity of the coordination strategy. A valid ATS(W) therefore contains for ts_k(W) in which a task fails a unique coordination strategy associated to the failure and the termination states contained in this coordination strategy are compatible with ts_k(W).

FIG. 3D is an exemplary table 106 of available services and transactional properties. For each task there is at least one service configured to fulfill the task according to for example functional requirements. As an example, the task t_1 may be fulfilled by the services s_11, s_12, and s_13. The transactional properties of the available services are specified by indicating if an available service is retriable or compensatable.

With the table 104 specifying the valid acceptable termination states ATS(W) and the table 106 specifying the transactional properties of the available services an assignment procedure may be derived. The assignment procedure is a transaction-aware procedure for assigning n services to the n tasks t_a in order to create an instance W_s of W acceptable with respect to a valid ATS(W). Therefore the instantiation process of workflows may be a systematic method ensuring the transactional consistency of an obtained composite service.

First a validity criteria for the instance W_s is defined with respect to ATS(W). An instance W_s of W with respect to ATS(W) is defined to be acceptable if and only if TS(W_s) is a subset of ATS(W). The condition TS(W_s) being a subset of ATS(W) may be expressed in terms of coordination strategies. The termination state generator of t_a present in ATS(W) is noted ts_k_a (W). The set of tasks whose execution is not cancelled when t_a fails is noted (t_a_i) i ∈ [1,za]. It follows that TS(W_s) is a subset of ATS(W) if and only if for all a ∈ [1, n] it is CS(W_s, ts_k_a (W), (t_a_i) i ∈ [1,za], t_a) is a subset of ATS(W).

It may be further derived the following: let a and k ∈ [1, n]×[1, j] such that ts_k(W, t_a)=failed and ts_k(W) is an element of ATS(W); there exists an W_s that is an acceptable instance of W with respect to ATS(W) such that ts_k(W) ∈ TS(W_s) if and only if there exists l ∈ [1, j] such that ts_l(W) ∈ TS(W_s) is a generator of t_a compatible with ts_k (W) in ATS(W). The relation states that an ATS(W) allowing the failure of a given task can be used to coordinate a composite service also allowing the failure of the same task if and only if ATS(W) contains a complete coordination strategy associated to the task, that is, ATS(W) is valid.

In the following a procedure is described that may be used to assign services to tasks based on the transactional requirements. The procedure uses ATS(W) as a set of requirements during the service assignment procedure and selects the services with transactional properties that match the conditions for the services. The procedure is an iterative process, that is, services are assigned to tasks sequentially one after the other. The procedure therefore creates at each operation a partial instance of W noted W~i_s. A set TS(W~i_s) may be defined that represents the termination states of W that may be reached taking into account that i services are already assigned. Intuitively the acceptable termination states refer to the degree of flexibility offered when choosing the services with respect to the different coordination strategies verified in ATS(W).

The degree of flexibility is influenced by two parameters: a first parameter is the list of acceptable termination states for each workflow task. The list can be determined using ATS (W). The list is a direct requirement which specifies the termination states allowed for each task and therefore introduces requirements on the transactional properties of a service that is to be assigned to a given task. The service can only reach the states defined in ATS(W) for the considered task. The second parameter includes conditions for the services that come from the process being iterative. The conditions may change following each selection of a service because $TS(W\sim i\_s)$ changes. As an example, the termination states $CTS(ts\_k(W), t\_a)$ allowing the failure of the task $t\_a$ may not be reachable following selection of a service (r) to $t\_a$. In such a case, the states reached by other tasks in $CTS(ts\_k(W), t\_a)$ may not be relevant and therefore there are no transactional requirements introduced for tasks to which services have not yet been assigned.

From the two parameters $ATS(W, t\_a)$ may be defined for a task $t\_a$ as being a set of acceptable termination states of $t\_a$ that are directly derived from ATS(W). In the example, ATS $(W, t\_a)$ may be identified with transactional conditions that a service selected to fulfill task $t\_a$ is required to fulfill. Furthermore, $DIS(t\_a, W\sim i\_s)$ may be defined as a set of requirements for a service assigned to $t\_a$ based on previous assignments. In the example, $DIS(t\_a, W\sim i\_s)$ may be identified with the derived conditions that are derived from previously selected services. The set $DIS(t\_a, W\sim i\_s)$ is determined based on the following reasoning: (DIS1), that is, the service is required to be compensatable if and only if compensated is an element of $DIS(t\_a, W\sim i\_s)$ and (DIS2), that is, a service is required to be retriable if and only if failed is not an element of $DIS(t\_a, W\sim i\_s)$.

Using the two sets, $ATS(W, t\_a)$ and $DIS(t\_a, W\sim i\_s)$, it may be possible to compute $MinTP(s\_a, t\_a, W\sim i\_s)$=intersection of $ATS(W, t\_a)$ and $DIS(t\_a, W\sim i\_s)$. $MinTP(s\_a, t\_a, W\sim i\_s)$ defines requirements that are related to conditions that a service $s\_a$ has at least to fulfill to be selected to the task $t\_a$ at the i+1 selection operation. The retriability and compensatability properties for the set $MinTP(s\_a, t\_a, W\sim i\_s)$ may be checked: failed is not an element of $MinTP(s\_a, t\_a, W\sim i\_s)$ if and only if $s\_a$ verifies the retriability property and compensated is an element of $MinTP(s\_a, t\_a, W\sim i\_s)$ if and only if $s\_a$ verifies the compensatability property.

The set $ATS(W, t\_a)$ may be directly derived from ATS(W) by identifying the acceptable termination states of task $t\_a$, for example, by searching the table 104 and collecting the states from the respective column. A procedure for computing $DIS(t\_a, W\sim i\_s)$ may involve more operations. As an example, it may be assumed that the procedure is at the i+1 operation, that is, the current partial instance of W is $W\sim i\_s$. Computing $DIS(t\_a, W\sim i\_s)$ relates to determining if (DIS1) and (DIS2) may be true.

From the two statements three properties can be derived: a first property is that (DIS1) implies that state compensated can be reached by $t\_a$. A second property is that (DIS2) implies that $t\_a$ cannot fail. A third property is that (DIS2) implies that $t\_a$ cannot be cancelled.

The two first properties may be directly derived from (DIS1) and (DIS2). The third property may be derived from the fact that if a task can not be cancelled when a task fails, then the task is required to finish the execution and to reach at least the state completed. In this case, if a service cannot be cancelled then the service cannot fail which is the third property.

$DIS(t\_a, W\sim i\_s)$ may be computed by comparing $t\_a$ with each of the i tasks $t\_b$ being an element of $W-\{t\_a\}$ to which a service $s\_b$ has been selected. It is an iterative procedure and at the initialization phase, because no task has been yet compared to $t\_a$, $s\_a$ can be (p) and $DIS(t\_a, W\sim i\_s)=\{failed\}$.

The first property may be derived by proving that if $t\_b$ verifies that $s\_b$ is not retriable and is assigned to $t\_b$ and there exists a $ts\_k(W)$ being an element of ATS(W) and being a generator of $t\_b$ such that $ts\_k(W, t\_a)$=compensated it follows that compensated is an element of $DIS(t\_a, W\sim i\_s)$ The second property may be derived by proving that if $t\_b$ verifies that either $s\_b$ not compensatable is assigned to $t\_b$ and there exists a $ts\_k(W)$ being an element of ATS(W) generator of $t\_a$ such that $ts\_k(W, t\_b)$=compensated or $t\_b$ is flexible to $t\_a$ and $s\_b$ not retriable is assigned to $t\_b$ and for all $ts\_k(W)$ being an element of ATS(W) it is true that from $ts\_k(W, t\_a)$=failed and $ts\_k(W, t\_b)\neq$cancelled it follows failed $\notin DIS(t\_a, W\sim i\_s)$. The third property may be derived by proving that if $t\_b$ is flexible to $t\_a$ and verifies that $s\_b$ not retriable is assigned to $t\_b$ and for all $ts\_k(W)$ being an element of ATS(W) it is true that $ts\_k(W, t\_b)$=failed and $ts\_k(W, t\_a)\neq$cancelled it follows that failed $\notin DIS(t\_a, W\sim i\_s)$.

The verification may stop in case that failed is not an element of $DIS(t\_a, W\sim i\_s)$ and compensated is an element of $DIS(t\_a, W\sim i\_s)$. With $MinTP(s\_a, t\_a, W\sim i\_s)$ it is possible to select the appropriate service and to assign the selected service to a given task.

Services may be assigned to each workflow task based on an iterative process. In the operations three different scenarios can occur selecting a service for a task: in a first scenario a service (rc) may be available for the task. A computation of the conditions may not be required because such a service matches the conditions. In a second scenario only services (p) may be available for the task. The conditions may be computed and either pivot is sufficient or there is no solution, that is, the transactional requirement may not be fulfilled by the available services. In a third scenario services (r) and services (c) may be available but no services (rc). The conditions may be computed and three cases may result. In a first case retriability and compensatability may be required and accordingly there is no solution. In a second case either retriability or compensatability may be required an appropriate service (r) or service (c) may be assigned to the task. In a third case the conditions may be restrictive, that is, may be fulfillable by any service.

According to the cases the services verifying scenarios (i) and (ii) may be selected first because there is no flexibility in the choice of the services. Following that services verifying (iii) are analyzed. In the example, the sequence conditions may be related to the scenarios (i), (ii), and (iii). The conditions may be that tasks for which services are selected and that fulfill scenario (i) and (ii) are selected prior to tasks for which services are selected and that fulfill scenario (iii).

Furthermore, tasks related to scenario (iii) for which the transactional requirements may exist may be selected prior to tasks related to scenario (iii) for which the transactional requirements may not exist. The transactional requirements of all the tasks to which services are not yet selected are also affected, that is, updated as a result of the current service selection. In case that no task has transactional requirements services (r) may be assigned to the tasks to assure the completion of the remaining tasks' execution. It finally follows that service selection procedure creates an instance of W that is acceptable with respect to a valid ATS(W).

For the coordination rules that are valid at runtime it follows from an acceptable instance W_s with respect to ATS(W): for the tasks (t_a_i) i ∈ [1,n_r] to which no retriable services have been assigned it is true that TS(W_s)=set union of {tscomp(Ws)} and the set union of (CTS(ts_k_a_i(W), t_a_i)−set union of FTS(t_a_i_j,t_a_i)) i ranging from 1 to n_r and j ranging from 1 to z_a_i. In a formal description the equality may be expressed as TS(W_s)={tscomp (Ws)} $\cup \cup_{i=1}^{in_r}$ (CTS(ts_k_a_i(W), t_a_i)−$\cup_{j=1}^{i=z\_a_i}$ FTS (t_a_i_j,t_a_i)). Therefore from TS(W_s) the coordination rules associated to the execution of Ws may be executed.

Using above procedure descriptions an exemplary selection of the services for the composite web service W_s, that is, the instance of workflow W (see FIG. 3A) may be as follows: Designers have defined ATS(W) according to table 104 (see FIG. 3C) as the transaction requirements. The set of available services for each task of W is according to table 106 (see FIG. 3D). A goal is to assign services to workflow tasks so that the instance of W is valid with respect to ATS(W). In the example, the services (rc) are assigned first because the services (rc) meet all conditions and no conditions are required to be computed. Accordingly, s_13 that is available for task 1 is selected and assigned to task 1.

It follows selecting and assigning the services (p) in case that the services (p) are the only available services for a task. We therefore verify whether s_41 can be selected for task 4. The conditions are computed to include ATS(W, t_4)={completed, failed} according to the column for task 4 and DIS(t_2,W∼1_1s)={failed} because the only selected service s_13 is (rc), that is, retriable and compensatable. The intersection of the two quantities ATS(W, t4) and DIS(t_2, W∼1_1s) is equal to {failed} and a service to be selected to task 4 requires only to be pivot as is the case of the service s_41. Therefore, s_41 is selected and assigned to task 4.

The conditions for services of task 2 for which services (r) and services (c) are available are ATS(W, t_2)={completed, compensated, failed, cancelled} and DIS(t_2,W∼1_2s)={failed}. No service is selected at this point because the selected service s_13 and the service s_41 do not verify the ATS(W) because no lines of the table 104 can be found to verify the conditions: as an example, ats_4 of table 104 specifies that the termination state of task 2 is completed and not compensated and task 4 is not executed in parallel with task 4. Therefore, no service for task 4 is selected and instead task 3 is checked.

For task 3 the conditions for the services are ATS(W, t_3)={completed, compensated, failed, cancelled} and DIS(t_3,W∼1_2s)={failed, compensated}. This follows from the service s_13 being (rc) and verifying any requirement and service s_41 verifying ats_4. It follows that the services for task 3 are required to be compensatable therefore service s_32 that is (c) is selected and assigned to task 3.

Now, task 2 is checked again and this time the conditions are ATS(W, t_2)={completed, compensated, failed, cancelled} and DIS(t_2,W∼1_3s)={compensated}. The resulting conditions are therefore that the service for task 2 is compensatable because conditions for task 3 can be verified with the service s_32 according to ats_2 of the table 104. Therefore the service s_22 being (c) is selected and assigned to task 2.

Figure 4:
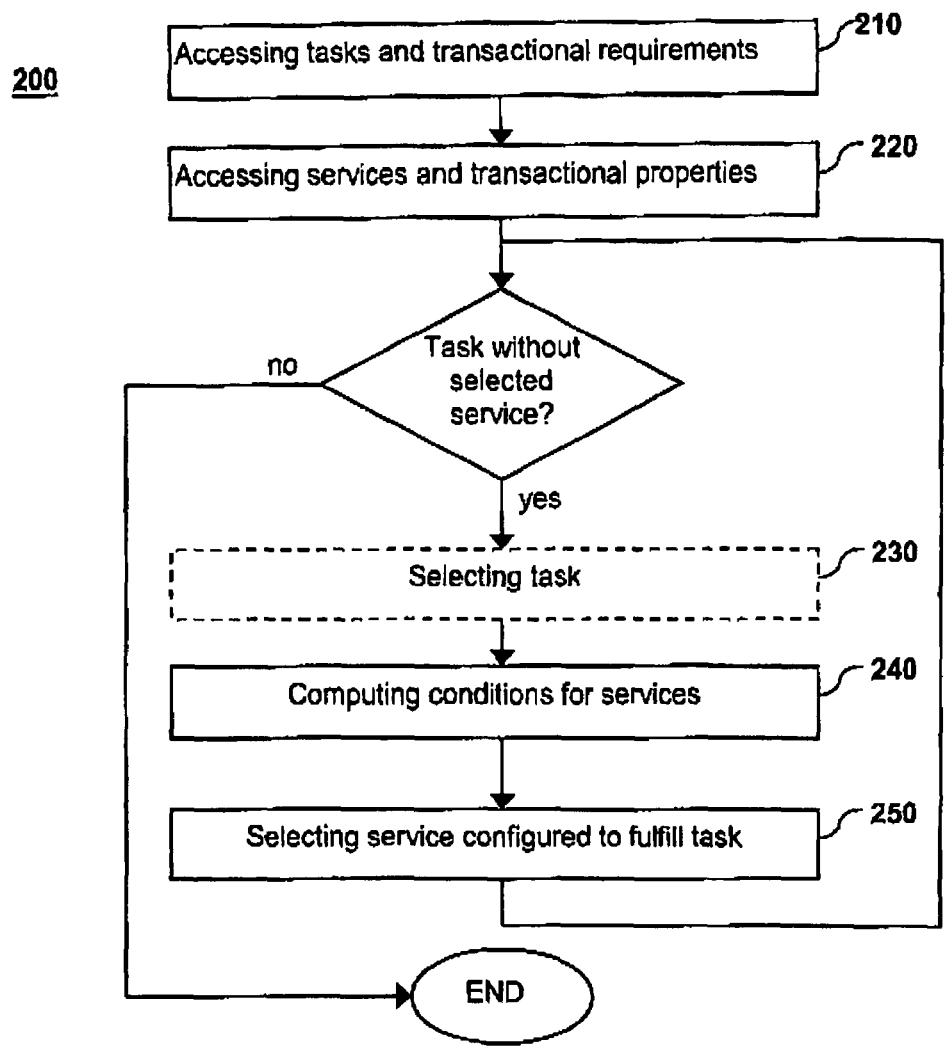
FIG. 4 is a simplified flow diagram of an exemplary embodiment.

FIG. 4 is a simplified flow diagram of an exemplary embodiment. The exemplary embodiment is computer-implemented method 200 for selecting the services. Optional method operations of the flow diagram are indicated by boxes with broken lines. The method has method operations accessing 210 the tasks and the transactional requirements of the tasks and accessing 220 the available services and the transactional properties of the services. The accessing method operations 210 and 220 may be executed in a different order and may include using an accessing unit.

In the exemplary embodiment the transactional requirements of the tasks may be represented by sets of acceptable termination states of the tasks. Each set of acceptable termination states may represent a consistent execution of the composite service. Furthermore, in case that a set of acceptable termination states includes a termination state failed task a unique recovery strategy may be required to be identified for the failed task. The recovery strategy determines one or more tasks of the set with termination state completed task and one or more further tasks of the set with termination state compensated task.

It may follow a check whether there is a task for which no service has been selected yet. In case of a negative result, that is, for all tasks a service has been selected the method may end. In case of a positive result it may follow operation selecting 230 the task according to sequence conditions. Possible sequence conditions may include a first sequence condition being that a task for which a service is selectable that is configured to fulfill the task and that is compensatable and retriable is selected prior to a task for which a service is not selectable that is configured to fulfill the task and that is compensatable and retriable. The sequence conditions may include a second sequence condition being that a task for which each selectable service that is configured to fulfill the task is not compensatable and not retriable is selected prior to a task for which a service is selectable that is configured to fulfill the task and that is either compensatable or retriable.

It may follow computing 240 conditions for services that are configured to fulfill a task. The conditions may be computed using data comprising the transactional requirements of the tasks. In the exemplary embodiment the conditions may include derived conditions that are derived from a previously selected service and transactional conditions that relate to acceptable termination states of the task. A first derived condition may be that the service is compensatable in case that the task has a termination state compensated task in accordance with a unique recovery strategy of a failed task for which a service has been selected previously. A second derived condition may be that the service is retriable in case that a unique recovery strategy for the task is not in accordance with transactional properties of a previously selected service. A first transactional condition may be that the service is compensatable in case that the task has an acceptable termination state compensated task. A second transactional condition may be that the service is retriable in case that the task has not an acceptable termination state task failed.

It may follow selecting 250 a service configured to fulfill the task and having transactional properties that fulfill the computed conditions.

It may then follow checking again if there is a task for which no service has been selected and in case of a positive result executed method operations for a further task.

A further embodiment may be a computer program product that includes instructions that are configured to be executed by a computer system and that cause the computer to perform method operations that include accessing 210, accessing 220, computing 240, and selecting 250. A further method operation that may be included is selecting 230. The computer program product may be stored on computer-readable media for carrying or having computer-executable instructions or data structures.

Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. In case that the computer-executable instructions are transformed, a first computer may for example transform the computer-executable instructions into the executable format and a second computer may execute the transformed instructions.

One embodiment is described in a general context of method operations which may be implemented by a computer program product. The computer program product may include computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing operations of the methods disclosed herein. The particular sequence of such executable instructions or associated data structures represents examples of corresponding acts for implementing the functions described in such operations.

Embodiments of the invention may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, handheld devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The invention claimed is:

1. A system for selecting services that are used for a composite service comprising a plurality of services, the system comprising:
   an accessing unit configured to access: tasks of the composite service, transactional requirements of the tasks, wherein the transactional requirements of the tasks are such that fulfilling the transactional requirements leads to a consistency of the composite service and are represented by sets of acceptable termination states of the tasks, services that are configured to fulfill the tasks, and transactional properties of the services, the transactional properties differentiating types of services by retriable services, compensatable services, retriable and compensatable services, and pivot services, each type of services defining possible termination states of the respective services; and
   a processing unit configured to: compute conditions for services that are configured to fulfill a task and use the conditions for services to select, according to a matchmaking procedure, a service and compose the composite service, the selected service configured to fulfill the task and having transactional properties that fulfill the conditions, wherein the conditions are computed using the transactional requirements of the tasks as input data,
   wherein the conditions comprise derived conditions that are derived from a previously selected service and transactional conditions that relate to acceptable termination states of the task, wherein a first derived condition is that the service is compensatable in case that the task has a termination state compensated task in accordance with a unique recovery strategy of a failed task for which a service has been selected previously, a second derived condition is that the service is retriable in case that a unique recovery strategy for the task is not in accordance with transactional properties of a previously selected service, a first transactional condition is that the service is compensatable in case that the task has an acceptable termination state compensated task, and a second transactional condition is that the service is retriable in case that the task has not an acceptable termination state task failed,
   wherein the task is selected according to sequence conditions, wherein a first sequence condition is that a task for which a service is selectable that is configured to fulfill the task and that is compensatable and retriable is selected prior to a task for which a service is not selectable that is configured to fulfill the task and that is compensatable and retriable and wherein a second sequence condition is that a task for which each selectable service that is configured to fulfill the task is not compensatable and not retriable is selected prior to a task for which a service is selectable that is configured to fulfill the task and that is either compensatable or retriable.

2. The system of claim 1 wherein the transactional requirements of the tasks are represented by sets of acceptable termination states of the tasks.

3. The system of claim 2 wherein a set that comprises a termination state failed task identifies a unique recovery strategy for the failed task, wherein the unique recovery strategy determines one or more tasks of the set with termination state completed task and one or more further tasks of the set with termination state compensated task, the compensated task being a termination state that is accessible following the completed task.

4. A computer-implemented method for selecting services that are used for a composite service, the method comprising:
    computing conditions for services that are configured to fulfill a task, wherein the conditions are computed using data comprising the transactional requirements of the tasks of the composite service as input data, wherein the transactional requirements of the tasks are such that fulfilling the transactional requirements leads to a consistency of the composite service and are represented by sets of acceptable termination states of the tasks;
    using the conditions for services to select, according to a match-making procedure, a service and compose the composite service, the selected service configured to fulfill the task and having transactional properties that fulfill the conditions, the transactional properties differentiating types of services by retriable services, compensatable services, retriable and compensatable services, and pivot services, each type of services defining possible termination states of the respective services; and
    selecting the task according to sequence conditions, wherein a first sequence condition is that a task for which a service is selectable that is configured to fulfill the task and that is compensatable and retriable is selected prior to a task for which a service is not selectable that is configured to fulfill the task and that is compensatable and retriable and wherein a second sequence condition is that a task for which each selectable service that is configured to fulfill the task is not compensatable and not retriable is selected prior to a task for which a service is selectable that is configured to fulfill the task and that is either compensatable or retriable,
    wherein the conditions comprise derived conditions that are derived from a previously selected service and transactional conditions that relate to acceptable termination states of the task, wherein a first derived condition is that the service is compensatable in case that the task has a termination state compensated task in accordance with a unique recovery strategy of a failed task for which a service has been selected previously, a second derived condition is that the service is retriable in case that a unique recovery strategy for the task is not in accordance with transactional properties of a previously selected service, a first transactional condition is that the service is compensatable in case that the task has an acceptable termination state compensated task, and a second transactional condition is that the service is retriable in case that the task has not an acceptable termination state task failed.

5. The method of claim 4 comprising:
    determining further conditions for services that are configured to fulfill a further task and selecting a further service configured to fulfill the further task and having transactional properties that fulfill the further conditions, wherein the further conditions are determined so that the transactional requirements of the further tasks are fulfilled.

6. The method of claim 4 wherein the transactional requirements of the tasks are represented by sets of acceptable termination states of the tasks.

7. The method of claim 6 wherein a set that comprises a termination state failed task identifies a unique recovery strategy for the failed task, wherein the unique recovery strategy determines one or more tasks of the set with termination state completed task and one or more further tasks of the set with termination state compensated task, compensated task being a termination state that is accessible following a completed task.

8. A non-transitory computer-readable storage medium storing a set of instructions that, when executed by a processor, cause the processor to perform operations, comprising:
    computing conditions for services that are configured to fulfill a task, wherein the conditions are computed using transactional requirements of the tasks of the composite service as input data, wherein the transactional requirements of the tasks are such that fulfilling the transactional requirements leads to a consistency of the composite service and are represented by sets of acceptable termination states of the tasks;
    using the conditions for services to select, according to a match-making procedure, a service and compose the composite service, the selected service configured to fulfill the task and having transactional properties that fulfill the conditions, the transactional properties differentiating types of services by retriable services, compensatable services, retriable and compensatable services, and pivot services, each type of services defining possible termination states of the respective services; and
    selecting the task according to sequence conditions, wherein a first sequence condition is that a task for which a service is selectable that is configured to fulfill the task and that is compensatable and retriable is selected prior to a task for which a service is not selectable that is configured to fulfill the task and that is compensatable and retriable and wherein a second sequence condition is that a task for which each selectable service that is configured to fulfill the task is not compensatable and not retriable is selected prior to a task for which a service is selectable that is configured to fulfill the task and that is either compensatable or retriable,
    wherein the conditions comprise derived conditions that are derived from a previously selected service and transactional conditions that relate to acceptable termination states of the task, wherein a first derived condition is that the service is compensatable in case that the task has a termination state compensated task in accordance with a unique recovery strategy of a failed task for which a service has been selected previously, a second derived condition is that the service is retriable in case that a unique recovery strategy for the task is not in accordance with transactional properties of a previously selected service, a first transactional condition is that the service is compensatable in case that the task has an acceptable termination state compensated task, and a second transactional condition is that the service is retriable in case that the task has not an acceptable termination state task failed.

* * * * *